United States Patent [19]

Bachelard et al.

[11] Patent Number: 4,532,121

[45] Date of Patent: Jul. 30, 1985

[54] PROCESS FOR THE PREPARATION OF FINELY DIVIDED ALUMINAS OR ALUMINA-MAGNESIA SPINELS HAVING HOMOGENEOUS PORE STRUCTURE

[75] Inventors: Roland Bachelard, Lyons; Maurice Lamalle, Saint-Genis-Laval, both of France

[73] Assignee: Produits Chimiques Ugine Kuhlmann, Courbevoie, France

[21] Appl. No.: 622,401

[22] Filed: Jun. 21, 1984

Related U.S. Application Data

[63] Continuation of Ser. No. 373,430, Apr. 30, 1982, abandoned.

[30] Foreign Application Priority Data

Jun. 2, 1981 [FR] France .................. 81 10872

[51] Int. Cl.³ .................. C01F 7/16; C01F 7/30; C01F 7/32
[52] U.S. Cl. .................. 423/600; 423/630; 423/625; 423/631
[58] Field of Search ............ 423/625, 631, 630, 600

[56] References Cited

U.S. PATENT DOCUMENTS

| | | | |
|---|---|---|---|
| 1,957,767 | 5/1934 | Fleischer | 423/631 |
| 1,957,768 | 5/1934 | Fleischer | 423/631 |
| 2,773,741 | 12/1956 | Antonsen | 423/625 |
| 3,325,247 | 6/1967 | Magee et al. | 423/628 |
| 3,679,361 | 7/1972 | Bonelli | 423/625 |
| 3,898,322 | 8/1975 | Leach | 423/628 |
| 4,085,201 | 4/1978 | Griffiths | 423/625 |
| 4,377,566 | 3/1983 | Bacheland et al. | 423/625 |

FOREIGN PATENT DOCUMENTS

| | | | |
|---|---|---|---|
| 426968 | 12/1974 | U.S.S.R. | 423/600 |
| 560827 | 9/1977 | U.S.S.R. | 423/600 |

*Primary Examiner*—H. T. Carter
*Attorney, Agent, or Firm*—Oblon, Fisher, Spivak, McClelland & Maier

[57] ABSTRACT

Processes for the preparation of pure alumina powders or pure non-stoichiometric alumina-magnesia spinel powders starting with ammonium alum-based compositions which are dehydrated, the dehydration being carried out on dehydrated salts having a bulk density less than 0.2 kg/dm³ and wherein the dehydration is followed by a calcination with a heating schedule containing at least one intermediate stage at 750° to 850° C., the process of the invention permitting the reproducible production of such aluminas or spinels having specific surfaces of from 100 to 200 m²/g and characterized by a very high homogeneity which guarantees a rigorously unimodal pore structure, such aluminas and spinels being useful in preparing isotopic enrichment barriers for gaseous diffusion, as well as metal polishes, catalysts, and catalyst supports.

18 Claims, No Drawings

PROCESS FOR THE PREPARATION OF FINELY DIVIDED ALUMINAS OR ALUMINA-MAGNESIA SPINELS HAVING HOMOGENEOUS PORE STRUCTURE

This application is a continuation, of application Ser. No. 373,430, filed Apr. 30, 1982 and now abandoned.

BACKGROUND OF THE INVENTION

The present invention relates to processes for the preparation of finely-divided alumina or non-stoichiometric spinel powders based on alumina by the thermal decomposition of ammonium alum or of mixtures of ammonium alum and the hydrated double sulfate of magnesium and ammonium, and more particularly, the present invention permits the production of a product characterized by a particularly fine and homogeneous pore structure when it is isostatically compressed at compaction pressures of at least 98 $MN/m^2$ and by very high purity (at least 99.98% $Al_2O_3$ plus possibly MgO excluding sulfate and particularly with a residual sulfur less than 0.5%) and by a specific area of at least 145 $m^2/g$.

The invention accordingly provides a means for obtaining homogeneous products comprised of very fine elementary particles and showing an improved compressability. The powders produced according to this invention are specifically useful in the manufacture of gaseous diffusion "barriers" for isotopic enrichment; for the preparation of ultrafiltration elements; and as loading minerals for particular paper products used to produce electrical condensers. The products of this invention are equally advantageously utilized for polishing metals and carbonaceous materials, and as catalysts or as catalyst supports.

The prior art technique of treating alum in circulating dishes in passage furnaces, for example, a tunnel furnace, does not generally permit obtaining products having surface areas greater than 125 $m^2/g$ for residual sulfur contents below 0.5%. It is nevertheless well known that these products are not very homogeneous and that the specific area attributed to them must be considered as intermediate. This is easily understood by the inequalities of treatment undergone by the product according to whether it is situated at the top or the bottom of the crucible.

These differences are especially occasioned by the time lags in the heating schedule and the composition of the gas surrounding the product during its formation. These heterogeneities affect the porosity of the alumina. In effect, when for example the powder has been locally overheated, it may have formed some corundum. Now this crystalline transformation is always accompanied by a considerable increase in the grain size, and this gives rise to a macroporosity in the spectrum of the pores. By contrast, a region insufficiently calcined will still contain a high proportion of undecomposed sulfate and will show a very high specific area. Upon compression this heterogeneity causes an undesirable widening of the distribution of pore volumes.

Moreover, more productive, short residence time apparatus must operate at high temperature rapidly to cause decomposition of the sulfates. But the resulting overheating of the product does not permit in this case the attainment of high specific surface areas, and in addition, the resulting product is very heterogeneous.

THE INVENTION

There is accordingly a particular commercial requirement for a dependable process which, starting with ammonium alum, permits the preparation of aluminas or of spinels having intermediate specific surfaces from about 100 to about 200 $m^2/g$ and characterized by a very high homogeneity which assures a very narrow unimodal pore structure. The present invention is based upon the discovery that obtaining very fine alumina powders of homogeneous pore size, starting from ammonium alum, requires total control of the reaction conditions of the raw material. This control is necessary for assignment of a definite thermal treatment schedule on the product during the course of preparation. Moreover, in the sulfate decomposition phase, it permits the selection and use of the desired gas phase composition surrounding the solid.

It is known that this reaction consists of several steps which successively give rise to molten alum, then to dehydrated alum, to aluminum sulfate, and finally to the alumina.

Briefly, the process of the present invention comprises obtaining the greatest possible dispersion of the dehydrated alum, then heating this according to a schedule containing at least one intermediate stage and achieving the elimination of the sulfur at the end of the calcination at a temperature no greater than 1050° C. It is possible to obtain a satisfactory dispersion of the dehydrated alum in various ways.

One of these ways involves utilizing the characteristic of this product to bring about a great expansion in volume during the dehydration starting from the molten alum. In addition, certain additives, desirably carbohydrates, including preferred carbohydrates such as sugars and starches, or urea alone or in admixture, can serve as swelling agents and increase the volume of the foam or "meringue" of dehydrated alum. In reality, more than the space occupied by the product, in this aspect its state of dispersion must be taken into account. In effect, in the "meringue", the dehydrated alum forms some small cells imprisoning some bubbles of gas.

The product will be all the better dispersed the smaller the bubbles are and thus the thinner the walls of the cells will be. With a sugar, for example, it can be verifiedd that the effect of dispersion reflects itself in the state of division of the final product. All things being equal, moreover, the specific area of the product increases with the quantity of sugar added to the alum.

Besides these dispersion adjuvants, the alum dehydration technique can be chosen to permit reaching the same result. This is especially the case in atomizing the melted alum by a hot gas current heated, for example, to 300° C. The dehydration proceeds almost instantaneously and gives a powder in the form of hollow spherical particles, with a bulk density of about 0.1 $Kg/dm^3$. The ensuing thermal decomposition of the anhydrous sulfates necessitates thereafter bringing the product above 650° C.

In fact, to carry out the operation under time conditons compatible with industrial practice, the product should be heated to at least 900° C. to bring the residual sulfur content to less than 0.5%. But to preserve a structure favorable to attaining the desired objectives, it is apparent that it is very advantageous to utilize a progressive heating schedue allowing in at least one stage of the zone a temperature going from 750° to 850° C. Its duration would be such that on leaving this phase the residual sulfur content does not exceed 3%. The calcination will then be carried out at a higher temperature to cause the elimination of sulfur under conditions such that the crystal growth is limited to a minimum. In fact, this ultimate step will take place between about 900° and about 1050° C.

Various modes of operation can be used to carry out the decomposition of the sulfates.

In the prior art, the product is prepared in boats in continuous passage furnaces or in batch furnaces. In these latter, a thermal cycle is used to successively achieve all of the steps of treatment including the dehydration. The passage furnaces comprise several sections at different temperature levels corresponding to the various stages. These tried techniques are unfavorable to heat and mass transfer. However, dealing with equilibrated and strongly endothermic reactions, the processes are slowed and the and with the goal of obtaining products having sufficient specific surfaces, operation is carried out in shallow beds operations are of great duration. To facilitate progress and with sweeping of the furnace by a gas containing the smallest possible amount of water vapor and sulfurous or sulfuric anhydrides. A furnace operating under vacuum gives one desirable alternative for mass transfer, but it is most unfortunately less advantageous for thermal transfer Some other more productive techniques can be envisaged, such as a fixed bed or the down-flow, or "drained", bed shown by Produits Chimiques Ugine Kuhlmann in French patent application No. 80/14620, filed on July 1, 1980, and in U.S. patent application Ser. No. 278,977, filed June 29, 1981. This disclosure describes a process for the preparation of high purity aluminas starting from ammonium alum in which dehydration of the alum and then thermal decomposition of the dehydrated alum are carried out separately, characterized by the fact that during the course of the thermal decomposition a hot, dry gas is forced to traverse the bed of dehydrated alum so as continuously to remove the gaseous products of the reaction, while at the same time preventing the possible movement of the solids by the carrier gases. This is the technique called "drained bed" or down-flow bed.

In the past, by reason of the fragility and the fineness of the product, the use of a fluidized bed was foregone in this case, despite the fact that this is one of the best systems for accelerating the transfers. In effect, the fluidization of dehydrated alum was accompanied by a disaggregation of the product by attrition with the production of an unacceptable quantity of fine particles. The product accordingly had to be treated in a fixed bed utilizing low gas velocities which are unfavorable to the required thermal and mass transfer. Some more favorable conditions already can be obtained in the drained bed, which permits utilization of an air flow very much greater than the flow of entrained matter, but nevertheless this is limited by pressure drop through the bed of material during the process.

It has surprisingly been found according to the present invention that the dehydrated alum can be treated in a fixed bed or in a drained bed after having been agglomerated by granulation, compacting, pelleting, or the like, without the compactness of the powder thus conditioned being a handicap to the decomposition velocity or to the homogeneity of the final product. This solution offers numerous advantages. In effect, the dehydrated alum is presented for example in the form of pellets of a few millimeters in equivalent diameter, and it becomes possible to establish a very porous fixed bed through which a very large quantity of gas can be blown without causing significant head losses. All things otherwise being equal, this establishes the final characteristics of the alumina obtained, depending on the composition of the atmosphere surrounding the pellets or granules. It is accordingly possible to control the product qualities by adjusting the composition of the gaseous phase which, because of the large supply furnished, is otherwise but slightly influenced by the sulfate decomposition products, that is, the ammonia, water, sulfur trioxide, and sulfur dioxide. The gases which play a role on the structure of the alumina are the water vapor and the sulfur oxides.

In the same manner, large charges can be treated in thick beds without difficulty by increasing the supply of entrainment gas. Another advantage of the present invention accruing from the possibility of conditioning the product in agglomerates is the improvement of the productivity of the system. In effect, while one dehydrated meringue or foam such as is obtained has a density generally less than 0.1 kg/dm$^3$, a bed of pellets can have a packed density greater than 0.7 kg/dm$^3$.

The technique of drained bed described in the aforesaid PCUK application applies particularly well to these conditions because it permits precisely forcing the gas through the agglomerate beds at a rate such that the speed of fluidization or even of entrainment is reached or exceeded without the product being put in motion by the carrier gas. These conditions are even more favorable than the fixed bed for obtaining a large surface and a high operating speed. The carrier gas which entrains the gaseous decomposition products will generally furnish the necessary heat for the reaction.

The invention is applicable to obtaining aluminas from alum. Moreover, it has been found that for obtaining the desired pore structure, the addition of other oxides can play a favorable role. This is particularly the case with magnesia, which when combined with the alumina, brings about the formation of a product of spinel structure comprised by a solid solution of spinel, $Al_2O_4Mg$, in alumina, $Al_2O_3$. Various magnesium salts can be utilized, but it is desirable to use those which are soluble in molten alum. This is the case for the hydrated double sulfate of magnesia and ammonium, $(NH_4)_2Mg(SO_4)_2.6\,H_2O$.

The total miscibility of the alum and of the magnesium sulfate in the molten state guarantees the homogeneity of magnesium distribution. The addition of the magnesia has a number of effects on the structure and the texture of the powder obtained. In effect, it permits in a certain measure the control of the specific area of the product. The greater the quantity of magnesia, MgO, the less is the specific area. Because of this fact, and keeping in mind the goal which is to prepare the finest possible powder having a unimodal pore structure, the desirable molar ratios of $Al_2O_3/MgO$ are practically limited to three or greater. Another advantage accruing from the presence of magnesia in the alumina is the narrowing of the distribution of pore radii around the maximum value.

Unless otherwise specified, all parts, percentages, proportions and ratios herein are by weight.

The following Examples are given to illustrate embodiments of the invention as it is presently preferred to practice it. It will be understood that these Examples are illustrative, and the invention is not to be considered as restricted thereto except as indicated in the appended Claims.

EXAMPLE I

In a quartz boat, 56.66 parts of crystalline ammonium alum is mixed with 3.76 parts of the hydrated double sulfate of magnesium and ammonium, 6 parts of urea, and 1 part of saccharose. The composition of this system is such that the molar ratio of $Al_2O_3$ to $MgO$ is equal to six. The mixture is brought to the fusion temperature, then heated to evaporate the water. The temperature progressively rises and this initial phase concludes by bringing the foam meringue so formed to 500° C., where it is maintained for 20 minutes. The apparent density of the dehydrated mixture is 0.07 kg/dm$^3$.

The mixture of dehydrated sulfate is introduced into a furnace preheated to 800° C., and it remains for three hours at that temperature. The calcination schedule entails a rise to 930° C. This is carried out over a period of 25 minutes. Upon arriving at this level, the product is maintained there for one hour and 30 minutes and is then removed from the oven. A spinel containing no free magnesia detectable by x-ray diffraction is obtained. Its residual sulfur content is determined by x-ray fluorescence to be 0.50%. Its specific area is measured by the BET method after desorption in a stream of nitrogen at 150° C., and is found to be 148.1 m$^2$/g.

The product is isostatically compressed to 98 MN/m$^2$. Then its porosity is measured by the introduction of mercury under pressure. It is determined that the porosity is unimodal, but that its maximum pore volume is pomprised of pores having radii between 4 and 5 nm.

EXAMPLE II

A mixture is prepared with the following composition: 56.66 parts of ammonium alum, 3.76 parts of the hydrated double sulfate of magnesium and ammonium, 6 parts of urea, and 4 parts of saccharose. The treatment of this mixture is identical to that set forth for the composition in Example I.

The bulk density of the dehydrated mixture is 0.02 kg/dm$^3$. The analysis of the final product shows that the nature of the product formed is a spinel of $Al_2O_3$/$MgO$ in a ratio of six. X-ray diffraction shows an absence of free $MgO$; a residual sulfur content of 0.50%; and a specific surface by the BET method of 172.7 m$^2$/g. The porosity under pressure obtained by isostatic compression at 98 MN/m$^2$ is unimodal with a maximum pore volume provided by pores having radii of about 4 nm.

COMPARATIVE EXAMPLE III

Some ammonium alum crystals are heated under vacuum with care taken to avoid melting. In progressively carrying the temperature from 85° C. to 190° C. under a vacuum of 30 mm Hg or less, nearly all of the water of crystallization is eliminated from the product without causing swelling or breaking of the grains. In this manner, dehydrated alum grains having a bulk density above 0.8 kg./dm$^3$ are obtained. This product is placed in an Inconel reactor having the form of a vertical cylinder. The charge rests on a horizontal bed of aluminous fibers.

The system is heated on the one hand electrically at the periphery of the cylinder and on the other hand by hot air which is blown through the bed in a dowdward direction. The charge of dehydrated product is introduced into the reactor at a loading of 230 parts per square decimeter of cross-section. The air flow is 1.4 Nm$^3$/hr per square decimeter of reactor cross-section. The furnace, preliminarily heated to 500° C., is rapidly brought to 850° C. where it is maintained for three hours, and then the temperature is raised to 930° C. in 15 minutes, where it is maintained for two more hours.

An eta-alumina is recovered containing less than 0.12% sulfur and having a specific area above 223.1 m$^2$/g.

Compressed at 98 MN/m$^2$, this powder although extremely fine shows a bimodal porosity with a population of micropores centered on a pore radius less than 4 nm and a second of mesopores centered about a radius of 55 nm.

This Example demonstrates that if the bulk density of the dehydrated mixture is not in the region taught according to the present invention, namely less than 0.2 kg/dm$^3$, the product obtained does not have the characteiistics obtained according to the invention.

COMPARATIVE EXAMPLE IV

A quartz boat is filled with a mixture of 56.66 parts of crystallized ammonium alum and 3.76parts of the hydrated double sulfate of magnesium and ammonium. The mixture of reactants is such that the molar ratio of $Al_2O_3$/$MgO$ is six. It additionally contains 6% saccharose and 2% urea. The bulk density of the dehydrated salts is 0.04 kg/dm$^3$.

To carry out the thermal treatment, two furnaces are preheated respectively to 500° C. and 930° C. The molten mixture is first introduced into the furnace at 500° C. in order to carry out the dehydration. The product is maintained there for 20 minutes at a level of 500° C. After cooling, the boat is immersed into a calcination furnace. Once the temperature of 930° C. is reached, the product remains two hours in the furnace.

Five consecutive attempts result in the following specific area of the spinel: 122, 124, 121, 119, and 128 m$^2$/g.

EXAMPLE V

The procedure of Example IV is repeated under different thermal treatment conditions. To accomplish this, a mixture of reactants having exactly the same composition as that in the preceding Example is prepared. Then the reactants are fused, followed by their introduction into a furnace preheated to 500° C., where the reactants are maintained at that temperature for 20 minutes. At this stage dehydrated sulfates are obtained under conditions exactly the same as those in Example IV.

These dehydrated sulfates are then introduced into a furnace preheated to 785° C. When thermal equilibrium is reached, the heating at 785° C. is maintained for three hours. Then the temperature is brought to 930° C. which requires 15 minutes, and the mixture is thereupon maintained at that temperature for another hour and 30 minutes.

The products recovered are identified a s alumina-magnesia spinels with the molar ratio of about six. Their respective specific surfaces are 171.7, 166.0, and 171.5 m$^2$/g. When consolidated, they comprise a homogeneous sample having the following characteristics: a residual sulfur content of 0.45%; a BET specific surface of 170 m$^2$/g; and a unimodal porosity with a maximum pore volume below 4 nm (under compression carried out at 196 MN/m$^2$).

The similarity of Examples IV and V demonstrates the essential role of the intermediate temperature stage on the texture and porous structure of the spinel.

EXAMPLE VI

A quartz boat is charged with a mixture of 56.66 parts of alum, 4.51 parts of magnesium sulfate, and 1.84 parts of saccharose. The mixture is brought to the fusion temperature and introduced into a furnace preheated to 500° C. for the dehydration. The duration of heating is 20 minutes at 500° C. After cooling, the dehydrated product is introduced into a ventilated furnace preheated to 800° C. The material is maintained for three hours at that temperature level before the temperature is raised to 930° C., where it is maintained for one hour and 30 minutes. After cooling, a spinel powder is recovered.

The bulk density of the dehydrated salts is 0.05 kg/dm$^3$. The spinel powder obtained after calcination has a specific area of 156.3 m$^2$/g.

EXAMPLE VII

A quartz boat is used to dehydrate a mixture of 113.32 parts of alum, 7.52 parts of the hydrated double sulfate of magnesium and ammonium, and 2.40 parts of sugar. The mixture is melted and dehydrated in an oven preheated to 450° C. The treatment at this temperature is carried out for 20 minutes. The bulk density of the dehydrated product is 0.09 kg/dm$^3$.

The recovered meringue foam is pulverized to obtain a powder having a bulk density of 0.4 kg/dm$^3$. The thermal decomposition of this product is carried out in a vertical cylindrical reactor as described in Example III, functioning as a drained bed. The down-flow gas is air containing 4% water by volume.

The reactant charge is 156 g/dm$^2$ of reactor cross-section. The hot down-flow gas is provided at the rate of 1.4 Nm$^3$/hr per square decimeter of cross section.

The following heating schedule is used: The charge is introduced into the preheated furnace, it is immediately brought to 800° C. and maintained at that level for three hours, and it is then brought to 930° C. in 15 minutes and maintained at that level for two hours. The passage of air through the powder bed elicits already from cold a head loss in the neighborhood of 24,500 pascals.

From the start of the decomposition, the pressure rapidly increases in the reactor to culminate at about 88,000 pascals, and then decreases progressively to about 10,000 pascals at the end of the 800° C. stage. A small pressure surge also manifests itself at the moment of rising to 930° C., but it is less intense than the first and rapidly disappears. This increase in reactor pressure limits the supply of air and the thickness of the product layer to be treated. At the end of the operation, a spinel powder having a specific area of 157.1 m$^2$/g is recovered. Its porous structure is narrowly unimodal and the diameter of the pores corresponding to the maximum pore volume is situated between four and five nanometers.

EXAMPLE VIII

Example VII is repeated with air containing 3.5% by volume of water as the down-flow gas, supplied at a rate of 3.7 Nm$^3$/hr-dm$^2$.

The spinel formed has a residual sulfur content of 0.26%. Its specific area is raised to 159.4 m$^2$/g.

What is claimed is:

1. A process for preparing a finely divided alumina from an ammonium-alum based composition comprising the following steps:
    (a) mixing an ammonium alum with a sweling agent, and heating said mixture above its fusion temperature, thereby obtaining a dehydrated alum composition having a bulk density less than 0.2kg/dm$^3$;
    (b) calcining the dehydrated material at a first temperature stage of from about 750° to 850° C. and a second temperature stage of from about 900° to 1050° C.; and then
    (c) recovering said alumina having a homogeneous unimodal pore structure with maximum pore radii between 4 and 5 mm and a specific area greater than 145 m$^2$/g.

2. The process of claim 1 wherein said dehydrated alum composition is calcined in a fixed bed in granular, pelleted, or compacted form.

3. The process of claim 1 wherein the calcination is carried out in a down-flow bed with a gas flow rate above the minimum fluidization velocity of the material.

4. The process of claim 1 wherein gas is passed through a bed of the dried material during calcination.

5. The process of claim 4 wherein the gas contains water vapor, sulfur oxides, or a mixture thereof.

6. The process of claim 1 wherein said first temperature stage heating is carried out for from about one to about five hours.

7. The process of claim 1 wherein said second temperature heating step is carried out for from about one to about three hours.

8. The process of claim 1 wherein said swelling agent added is selected from the group consisting of sugars, starches and urea.

9. A process for preparing a finely divided non-stoichiometric alumina-magnesium spinel powder from an ammonium-alum based composition comprising the following steps:
    (a) mixing an ammonium alum, a magnesium salt and a swelling agent, and heating said mixture above its fusion temperature, thereby obtaining a dehydrated alum composition having a bulk density less than 0.2 kg/dm$^3$;
    (b) calcining the dehydrated at a first temperature stage of from about 750° to 850° C. and a second temperature stage of from about 900° to 1050° C.; and then
    (c) recovering said spinel powder having a homogeneous unimodal pore structure with maximum pore radii between 4 and 5 mm and a specific area greater than 145 m$^2$/g.

10. The process of claim 9 for the preparation of spinel powder in which the ratio of Al$_2$O$_3$/MgO is three or more.

11. The process of claim 10 wherein the ratio is from three to six.

12. The process of claim 9 wherein said swelling agent added is selected from the group consisting of sugars, starches and urea.

13. The process of claim 9 wherein said dehydrated material is calcined in a fixed bed in granular, pelleted, or compacted form.

14. The process of claim 9 wherein the calcination is carried out in a down-flow bed with a gas flow rate above the minimum fluidization velocity of the material.

15. The process of claim 9 wherein gas is passed through a bed of the dried material during calcination.

16. The process according to claim 15 wherein the gas contains water vapor, sulfur oxides, or a mixture thereof.

17. The process of claim 9 wherein said first temperature stage heating is carried out for from about one to about five hours.

18. The process of claim 9 wherein said second temperature heating step is carried out for from about one to about three hours.

* * * * *